United States Patent
Sun et al.

(10) Patent No.: US 10,683,403 B2
(45) Date of Patent: *Jun. 16, 2020

(54) POLYURETHANE COMPOSITE MATERIAL AND PROCESS OF PREPARING SAME

(71) Applicant: COVESTRO DEUTSCHLAND AG, Leverkusen (DE)

(72) Inventors: Guobin Sun, Shanghai (CN); Yongming Gu, Shanghai (CN); Fei Wu, Yichang (CN); James (Zhan) Chen, Shanghai (CN); Ian (Yichen) Zheng, Shanghai (CN); Yuan Cheng, Shanghai (CN); Hui Zhao, Shanghai (CN)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/370,180

(22) Filed: Mar. 29, 2019

(65) Prior Publication Data

US 2019/0225761 A1 Jul. 25, 2019

Related U.S. Application Data

(63) Continuation of application No. 15/303,185, filed as application No. PCT/EP2015/057541 on Apr. 8, 2015, now Pat. No. 10,344,130.

(30) Foreign Application Priority Data

Apr. 10, 2014 (CN) .......................... 2014 1 0156175
Dec. 23, 2014 (CN) .......................... 2014 1 0840608

(51) Int. Cl.
| | | |
|---|---|---|
| C08J 5/04 | (2006.01) | |
| C08G 18/08 | (2006.01) | |
| C08G 18/48 | (2006.01) | |
| C08G 18/67 | (2006.01) | |
| C08F 290/06 | (2006.01) | |
| C08F 299/06 | (2006.01) | |
| B29L 31/08 | (2006.01) | |

(52) U.S. Cl.
CPC ........... *C08J 5/043* (2013.01); *C08F 290/067* (2013.01); *C08F 299/06* (2013.01); *C08G 18/08* (2013.01); *C08G 18/4829* (2013.01); *C08G 18/672* (2013.01); *B29L 2031/085* (2013.01); *C08J 2375/08* (2013.01); *Y02P 70/523* (2015.11)

(58) Field of Classification Search
CPC .... C08J 5/043; C08G 18/4829; C08G 18/672; C08G 18/08; B29L 2301/085; C08F 299/06; C08F 290/067; Y02P 70/523
USPC .......................................................... 524/875
See application file for complete search history.

(56) References Cited

U.S. PATENT DOCUMENTS

| | | | | |
|---|---|---|---|---|
| 4,522,969 | A | * 6/1985 | O'Connor | ........... C08F 299/065 524/425 |
| 4,666,783 | A | 5/1987 | Heil et al. | |
| 5,824,413 | A | * 10/1998 | Schell | ..................... C03C 25/26 428/378 |
| 6,455,606 | B1 | 9/2002 | Motonao et al. | |
| 2004/0024118 | A1 | 2/2004 | Weihrauch et al. | |
| 2012/0245286 | A1 | * 9/2012 | Younes | ................ C08G 18/715 524/873 |

FOREIGN PATENT DOCUMENTS

| | | | | |
|---|---|---|---|---|
| EP | | 0020041 A1 | * 12/1980 | .......... C08F 290/067 |
| EP | | 0020041 A1 | 12/1980 | |
| WO | | 2008070762 A1 | 6/2008 | |
| WO | WO 2012/004088 A1 | | 1/2012 | |

* cited by examiner

*Primary Examiner* — Hui H Chin
(74) *Attorney, Agent, or Firm* — K&L Gates LLP

(57) ABSTRACT

The present invention relates to a polyurethane composite material, comprising a polyurethane resin matrix prepared from a polyurethane composition, and a reinforcement material, wherein the polyurethane composition comprises: A) an isocyanate component comprising one or more organic polyisocyanates; B) an isocyanate-reactive component comprising: b1) one or more organic polyols having an amount of 21-60 wt. % based on 100% by weight of the polyurethane composition; b2) one or more (meth)acrylates comprising hydroxyl groups; and C) a radical reaction initiator; wherein the polyurethane resin matrix is prepared under such reaction conditions that the polyurethane composition undergoes addition polymerization reaction of isocyanate groups and hydroxyl groups and radical polymerization reaction simultaneously. The present invention further relates to the preparation process of the polyurethane composite material.

6 Claims, No Drawings

POLYURETHANE COMPOSITE MATERIAL AND PROCESS OF PREPARING SAME

CROSS REFERENCE TO RELATED APPLICATIONS

This application is a continuation application claiming priority under 35 U.S.C. § 120 to U.S. application Ser. No. 15/303,185, which was filed on Oct. 10, 2016 under 35 U.S.C. § 371, and which claims priority to PCT/EP2015/057541, which was filed on Apr. 8, 2015, and which claims priority to Chinese Patent Application No. CN 201410840608.5, filed Dec. 23, 2014 and Chinese Patent Application No. CN 201410156175.1, filed Apr. 10, 2014, the contents of each of which are incorporated by reference into this specification.

TECHNICAL FIELD

The invention relates to a polyurethane composite material comprising a polyurethane resin matrix and a reinforcement material and a process of preparing the same. Particularly, the polyurethane resin matrix is prepared under such reaction conditions that a polyurethane composition undergoes addition polymerization reaction of isocyanate groups and hydroxyl groups and radical polymerization reaction simultaneously.

BACKGROUND ART

A fiber reinforced polyurethane composite material is composed of two or more different physical phases, wherein a fiber is distributed in a continuous phase of a polyurethane resin matrix. As compared with a conventional material, a fiber reinforced polyurethane composite material features light weight, good corrosion resistance, high toughness and high processability. However, as a traditional polyurethane system has a short gel time or pot life, it is quite demanding on an application process. Moreover, a polyurethane resin prepared under process conditions for preparing a fiber reinforced high molecular composite material still has insufficient mechanical properties and strength.

Patent Application WO91/18933 discloses a resin composition for resin injection molding, comprising: a component comprising an unsaturated bond and an active group which can react with isocyanate; an ethylenic monomer which can undergo radical polymerization reaction with the above component; an isocyanate comprising an isocyanate group having a functionality of greater than 1.75; and a compound comprising two or more isocyanate-reactive groups or vinyl unsaturated groups, wherein the compound has an amount of 2-20% and a molecular weight of 500-3000. This resin composition may be made into a polyurethane composite material by resin injection molding, resin transfer molding, etc.

Patent Application WO2002/083758 discloses a LPA hybrid, comprising: a first component comprising at least one ethylenic bond and an isocyanate reactive group; a second component which is an ethylenically unsaturated monomer that can react with the first component by means of radical polymerization; a third component consisting of a polyisocyanate that can react with the first component by means of polyurethane reaction and that has an average functionality of at least 1.75; a fourth component which is a catalyst for the radical polymerization; and a thermoplastic polymer comprising 3-20% of the hybrid and having a molecular weight of at least 10,000 Dalton.

SUMMARY

One object of the invention is to provide a polyurethane composite material, wherein a polyurethane composition for forming a polyurethane resin matrix has a relatively long gel time or pot life to improve processability. In addition, the polyurethane composite material prepared from this polyurethane composition has good mechanical properties.

In one aspect, the invention relates to a polyurethane composite material, comprising a polyurethane resin matrix prepared from a polyurethane composition, and a reinforcement material, wherein the polyurethane composition comprises:
  A) an isocyanate component comprising one or more organic polyisocyanates;
  B) an isocyanate-reactive component comprising:
  b1) one or more organic polyols having an amount of 21-60 wt. % based on 100% by weight of the polyurethane composition;
  b2) one or more compounds having structure (I)

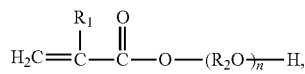

wherein $R_1$ is selected from hydrogen, methyl or ethyl; $R_2$ is selected from alkylene groups having 2-6 carbon atoms, 2,2-bis(4-phenylene) propane, 1,4-bis(methylene)benzene, 1,3-bis(methylene)benzene, 1,2-bis(methylene) benzene; n is an integer selected from 1-6; and
  C) a radical reaction initiator,
wherein the polyurethane resin matrix is prepared under such reaction conditions that the polyurethane composition undergoes addition polymerization reaction of isocyanate groups and hydroxyl groups and radical polymerization reaction simultaneously.

In an embodiment of the invention, the component b1) is selected from one or more polyether polyols.

In another embodiment of the invention, the component b2) is selected from the group consisting of hydroxyethyl methacrylate, hydroxypropyl methacrylate, hydroxybutyl methacrylate, hydroxyethyl acrylate, hydroxypropyl acrylate, hydroxybutyl acrylate and combinations thereof.

In still another embodiment of the invention, the organic polyols have a functionality of 1.7-6 and a hydroxyl number of 150 to 1100 mg KOH/g. Preferably, the polyurethane composite material is prepared by a process selected from compression molding, filament winding, hand lay-up moulding, spray lay-up moulding and combinations thereof.

In yet another embodiment of the invention, the organic polyols have a functionality of 1.9-4.5 and a hydroxyl number of 150 to 550 mg KOH/g. Preferably, the polyurethane composite material is prepared by vacuum infusion process.

In yet another embodiment of the invention, the reinforcement material is selected from the group consisting of glass fibers, carbon nanotubes, carbon fibers, polyester fibers, natural fibers, aramid fibers, nylon fibers, basalt fibers, boron fibers, silicon carbide fibers, asbestos fibers, whiskers, hard particles, metal fibers and combinations thereof.

In another aspect, the invention relates to a process of preparing a polyurethane composite material which comprises a polyurethane resin matrix and a reinforcement material, comprising: preparing the polyurethane resin matrix under such reaction conditions that a polyurethane composition undergoes addition polymerization reaction of isocyanate groups and hydroxyl groups and radical polymerization reaction simultaneously, wherein the polyurethane composition comprises:

A) an isocyanate component comprising one or more organic polyisocyanates;

B) an isocyanate-reactive component comprising:
b1) one or more organic polyols having an amount of 21-60 wt. % based on 100% by weight of the polyurethane composition;
b2) one or more compounds having structure (I)

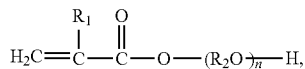

wherein $R_1$ is selected from hydrogen, methyl or ethyl; $R_2$ is selected from alkylene groups having 2-6 carbon atoms, 2,2-bis(4-phenylene) propane, 1,4-bis(methylene)benzene, 1,3-bis(methylene)benzene, 1,2-bis(methylene) benzene; n is an integer selected from 1-6; and C) a radical reaction initiator.

In one embodiment of the invention, the component b1) is selected from one or more polyether polyols.

In another embodiment of the invention, the component b2) is selected from the group consisting of hydroxyethyl methacrylate, hydroxypropyl methacrylate, hydroxybutyl methacrylate, hydroxyethyl acrylate, hydroxypropyl acrylate, hydroxybutyl acrylate and combinations thereof.

In still another embodiment of the invention, the organic polyols have a functionality of 1.7-6 and a hydroxyl number of 150 to 1100 mg KOH/g. Preferably, the polyurethane composite material is prepared by a process selected from compression molding, filament winding, hand lay-up moulding, spray lay-up moulding and combinations thereof.

In yet another embodiment of the invention, the organic polyols have a functionality of 1.9-4.5 and a hydroxyl number of 150 to 550 mg KOH/g. Preferably, the polyurethane composite material is prepared by vacuum infusion process.

In yet another embodiment of the invention, the reinforcement material is selected from the group consisting of glass fibers, carbon fibers, polyester fibers, natural fibers, aramid fibers, nylon fibers, basalt fibers, boron fibers, silicon carbide fibers, asbestos fibers, whiskers, hard particles, metal fibers and combinations thereof.

DETAILED DESCRIPTION

I. Polyurethane Composite Material

The polyurethane composite material provided according to the invention comprises a polyurethane resin matrix prepared from a polyurethane composition, and a reinforcement material, wherein the polyurethane composition comprises:

A) an isocyanate component comprising one or more organic polyisocyanates;

B) an isocyanate-reactive component comprising:
b1) one or more organic polyols having an amount of 21-60 wt. % based on 100% by weight of the polyurethane composition;
b2) one or more compounds having structure (I)

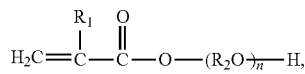

wherein $R_1$ is selected from hydrogen, methyl or ethyl; $R_2$ is selected from alkylene groups having 2-6 carbon atoms, 2,2-bis(4-phenylene) propane, 1,4-bis(methylene)benzene, 1,3-bis(methylene)benzene, 1,2-bis(methylene) benzene; n is an integer selected from 1-6; and C) a radical reaction initiator, wherein the polyurethane resin matrix is prepared under such reaction conditions that the polyurethane composition undergoes addition polymerization reaction of isocyanate groups and hydroxyl groups and radical polymerization reaction simultaneously.

In an embodiment of the invention, the reinforcement material is selected from fiber reinforcement materials, carbon nanotubes, hard particles and combinations thereof, more preferably fiber reinforcement materials. The reinforcement material has an amount of 5-95 wt. %, preferably 30-85 wt. %, based on 100 wt. % by weight of the polyurethane composite material.

When used in the invention, the fiber reinforcement material is not limited in shape and size. For example, it may be a continuous fiber, a fiber net formed by bonding, or a fibrous fabric.

In some embodiments of the invention, the fiber reinforcement material is selected from the group consisting of glass fibers, carbon fibers, polyester fibers, natural fibers, aramid fibers, nylon fibers, basalt fibers, boron fibers, silicon carbide fibers, asbestos fibers, whiskers, metal fibers and combinations thereof.

In an embodiment of the invention, the organic polyisocyanate may be any aliphatic, cycloaliphatic or aromatic isocyanate known for preparing polyurethane. The examples include but are not limited to toluene diisocyanate(TDI), diphenylmethane diisocyanate (MDI), polyphenylmethane polyisocyanate (pMDI), 1,5-naphthalene diisocyanate (NDI), hexamethylene diisocyanate (HDI), methylcyclohexyl diisocyanate (TDI), 4,4'-dicyclohexylmethane diisocyanate, isophorone diisocyanate (IPDI), p-phenylene diisocyanate (PPDI), xylene diisocyanate (XDI), tetramethyldimethylene diisocyanate (TMXDI), polymers thereof or compositions thereof. The isocyanate useful for the invention has a functionality of 2.0-3.5, preferably 2.1-2.9. The viscosity of the isocyanate is preferably 5-700 mPa·s, more preferably 10-300 mPa·s as measured at 25° C. according to DIN 53019-1-3.

When used in the invention, the organic polyisocyanate includes dimer, trimer, tetramer or pentamer of isocyanate or a combination thereof.

In a preferred embodiment of the invention, the isocyanate component a) is selected from the group consisting of diphenylmethane diisocyanate (MDI), polyphenylmethane polyisocyanate (pMDI), polymers thereof, prepolymers thereof, and combinations thereof.

A capped isocyanate, which may be prepared by reaction of an excessive amount of an organic polyisocyanate or a mixture of organic polyisocyanates with a polyol compound, may also be used as the isocyanate component a). One skilled in the art knows these compounds and methods for preparing the same.

In an embodiment of the invention, the isocyanate-reactive component comprises one or more organic polyols b1). The organic polyol has an amount of 21-60 wt. %, based on 100 wt. % by weight of the polyurethane composition. The organic polyols may be those commonly used to prepare polyurethane in the art, including but not limited to polyether polyols, polyethercarbonate polyols, polyester polyols, polycarbonate diols, polymer polyols, vegetable oil based polyols or combinations thereof.

The polyether polyol may be prepared by a known process, for example, by reacting an olefin oxide with a starter in the presence of a catalyst. The catalyst is preferably but not limited to an alkaline hydroxide, an alkaline alkoxide, antimony pentachloride, boron trifluoride-diethyl etherate or a combination thereof. The olefin oxide is preferably but not limited to tetrahydrofuran, ethylene oxide, propylene oxide, 1,2-butylene oxide, 2,3-butylene oxide, styrene oxide, or a combination thereof; preferably ethylene oxide and/or propylene oxide. The starter is preferably but not limited to a polyhydroxy compound or a polyamino compound, wherein the polyhydroxy compound is preferably but not limited to water, ethylene glycol, 1,2-propanediol, 1,3-propanediol, diethylene glycol, trimethylolpropane, glycerine, bisphenol A, bisphenol S or a combination thereof, and the polyamino compound is preferably but not limited to ethylene diamine, propanediamine, butanediamine, hexanediamine, diethylene triamine, toluene diamine or a combination thereof.

The polyethercarbonate polyol, which may be prepared by addition of carbon dioxide and an alkylene oxide compound to a starter comprising active hydrogen in the presence of a double metal cyanide catalyst, may also be used in the invention.

The polyester polyol is prepared by reaction between a dibasic carboxylic acid or a dibasic carboxylic anhydride and a polyol. The dibasic carboxylic acid is preferably but not limited to an aliphatic carboxylic acid having 2-12 carbons, preferably but not limited to succinic acid, malonic acid, glutaric acid, adipic acid, suberic acid, azelaic acid, sebacic acid, dodecyl carboxylic acid, maleic acid, fumaric acid, phthalic acid, isophthalic acid, terephthalic acid, or a combination thereof. The dibasic carboxylic anhydride is preferably but not limited to phthalic anhydride, tetrachlorophthalic anhydride, maleic anhydride or a combination thereof. The polyol that reacts with the dibasic carboxylic acid or anhydride is preferably but not limited to ethylene glycol, diethylene glycol, 1,2-propanediol, 1,3-propanediol, dipropylene glycol, 1,3-methylpropanediol, 1,4-butanediol, 1,5-pentanediol, 1,6-hexanediol, neopentyl glycol, 1,10-decanediol, glycerine, trimethylolpropane, or a combination thereof. The polyester polyol also includes a polyester polyol prepared from a lactone. The polyester polyol prepared from a lactone is preferably but not limited to ε-caprolactone. Preferably, the polyester polyol has a molecular weight of 200-3000 and a functionality of 2-6, preferably 2-4, more preferably 2-3.

The polycarbonate diol may be prepared by reacting a diol with a dihydrocarbyl carbonate or a diaryl carbonate or phosgene. The diol is preferably but not limited to 1,2-propanediol, 1,3-propanediol, 1,4-butanediol, 1,5-pentanediol, 1,6-hexanediol, diethylene glycol, trioxane diol or a mixture thereof. The dihydrocarbyl or diaryl carbonate is preferably but not limited to diphenyl carbonate.

The polymer polyol may be a polymer modified polyether polyol, preferably a grafted polyether polyol, or a polyether polyol dispersion. The grafted polyether polyol is preferably a styrene and/or acrylonitrile based grafted polyether polyol, wherein the styrene and/or acrylonitrile may be obtained by in situ polymerization of styrene, acrylonitrile, or a mixture of styrene and acrylonitrile, wherein the ratio of styrene to acrylonitrile in the mixture of styrene and acrylonitrile is 90:10-10:90, preferably 70:30-30:70. The polymer polyol in the invention may also be castor oil, wood tar or other bio-based polyols. The polymer polyether polyol dispersion comprises a dispersion phase, e.g. an inorganic filler, a polyurea, a polyhydrazide, a polyurethane comprising a bonded tertiary amino group and/or melamine. The dispersion phase has an amount of 1-50 wt. %, preferably 1-45 wt. %, based on 100% by weight of the polymer polyether polyol. Preferably, the polymer polyether polyol has a polymer solid content of 20%-45% based on 100% by weight of the polymer polyether and a hydroxyl number of 20-50 mgKOH/g.

The vegetable oil based polyol, when used in the invention, includes vegetable oils, vegetable oil polyols or modified products thereof. Vegetable oil is a compound prepared from an unsaturated fatty acid and glycine, or an oil extracted from plant fruits, seeds or embryos, which is preferably but not limited to peanut oil, bean oil, linseed oil, castor oil, rape seed oil, or palm oil. The vegetable oil polyol is a polyol originated from one or more vegetable oils. A starter for synthesis of a vegetable oil polyol includes but is not limited to soybean oil, palm oil, peanut oil, canola oil and castor oil. Hydroxyl group may be introduced into the starter of a vegetable oil polyol by a process such as cracking, oxidation or transesterification, and then the vegetable oil polyol may be prepared using a process known to one skilled in the art for preparing an organic polyol.

The methods for measuring hydroxyl number are well known to one skilled in the art and are disclosed by, for example, Houben Weyl, Methoden der Organischen Chemie, vol. XIV/2 Makromolekulare Stoffe, p. 17, Georg Thieme Verlag; Stuttgart 1963, which is incorporated herein in its entity by reference.

Unless otherwise specified, the functionality and the hydroxyl number of an organic polyol as used herein refer to an average functionality and an average hydroxyl group respectively.

In an embodiment of the invention, the isocyanate-reactive component further comprises one or more compounds b2) having structure (I):

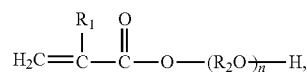

I wherein $R_1$ is selected from hydrogen, methyl or ethyl; $R_2$ is selected from alkylene groups having 2-6 carbon atoms; and n is an integer selected from 1-6.

In a preferred embodiment of the invention, $R_2$ is selected from ethylene, trimethylene, tetramethylene, pentamethylene, 1-methyl-1,2-ethylene, 2-methyl-1,2-ethylene, 1-ethyl-1,2-ethylene, 2-ethyl-1,2-ethylene, 1-methyl-1,3-propylene, 2-methyl-1,3-propylene, 3-methyl-1,3-propylene, 1-ethyl-1, 2-propylene, 2-ethyl-1,3-propylene, 3-ethyl-1,3-propylene, 1-methyl-1,4-butylene, 2-methyl-1,4-butylene, 3-methy 1-1, 4-butylene, 4-methyl-1,4-butylene, 2,2-di(4-phenylene)- propane, 1,4-dimethylene benzene, 1,3-dimethylene benzene, and 1,2-dimethylene benzene.

In a preferred embodiment of the invention, the component b2) is selected from the group consisting of hydroxyethyl methacrylate, hydroxypropyl methacrylate, hydroxybutyl methacrylate, hydroxyethyl acrylate, hydroxypropyl acrylate, hydroxybutyl acrylate and combinations thereof.

The compound of structure (I) may be prepared using a conventional method in the art, e.g. by esterification reaction between (meth)acrylic anhydride, (meth)acrylic acid or (meth)acryloyl halide and HO—$(R_2O)_n$—H. This method is known to one skilled in the art. See, for example, the description in Chapter 3, Handbook of Polyurethane Raw Materials And Aids (Liu Yijun, published on Apr. 1, 2005) and Chapter 2, Polyurethane Elastomer (Liu Houjun, published in August, 2012), which are incorporated herein in their entity by reference.

In an embodiment of the invention, the polyurethane composition further comprises C) a radical reaction initiator. The radical initiator used in the invention may be added into the polyol component or the isocyanate component or both. The initiator includes but is not limited to peroxides, persulfides, peroxycarbonates, peroxyboric acid, azo compounds or other suitable radical initiators that can initiate curing of a double bond-containing compound. The examples include tert-butylperoxy isopropyl carbonate, tert-butylperoxy 3,5,5-trimethylhexanoate, methyl ethyl ketone peroxide, and cumene hydroperoxide.

Generally, the radical reaction initiator has an amount of 0.1-8 wt. %, based on 100 wt. % by weight of the isocyanate reactive component. In addition, there may be present an accelerator, such as cobalt compounds or amine compounds.

In an embodiment of the invention, the polyurethane composition may further comprise a catalyst for catalyzing the reaction between isocyanate group (NCO) and hydroxyl group (OH). A catalyst suitable for polyurethane reaction is preferably but not limited to an amine catalyst, an organometallic catalyst or a mixture thereof. The amine catalyst is preferably but not limited to triethylamine, tributylamine, triethylenediamine, N-ethylmorpholine, N,N,N',N'-tetramethylethylenediamine, pentamethyldiethylenetriamine, N-methylaniline, N,N-dimethylaniline, or a mixture thereof. The organometallic catalyst is preferably but not limited to an organotin compound, e.g. tin (II) acetate, tin (II) octanoate, tin ethylhexanoate, tin laurate, dibutyl tin oxide, dibutyl tin dichloride, dibutyl tin diacetate, dibutyl tin maleate, dioctyl tin diacetate, or a mixture thereof. The catalyst has an amount of 0.001-10 wt. %, based on 100 wt. % by weight of the isocyanate reactive component.

In an embodiment of the invention, for the polyurethane reaction, i.e. the addition polymerization of isocyanate group and hydroxyl group, the isocyanate group may be one carried by the organic polyisocyanate (component A), or one carried by the intermediate product of the reaction between the organic polyisocyanate (component A) and the organic polyol (component b1) or component b2)); and the hydroxyl group may be one carried by the organic polyol (component b1) or component b2)), or one carried by the intermediate product of the reaction between the organic polyisocyanate (component A) and the organic polyol (component b1) or component b2)).

In an embodiment of the invention, the radical polymerization reaction is an ethylenical addition polymerization, wherein the ethylenical bond may be one carried by component b2), or one carried by the intermediate product of the reaction between component b2) and the organic polyisocyanate.

In an embodiment of the invention, the polyurethane addition polymerization (i.e. the addition polymerization of isocyanate group and hydroxyl group) and the radical polymerization occur at the same time. As known to one skilled in the art, reaction conditions may be chosen suitably such that the polyurethane addition polymerization and the radical polymerization undergo in tandem. However, the polyurethane matrix thus prepared is structurally different from the polyurethane resin matrix prepared by allowing the polyurethane addition polymerization and the radical polymerization to take place simultaneously. Consequently, the resulting polyurethane composite materials have different mechanical properties and process characteristics.

In an embodiment of the invention, the polyurethane composition may also comprise an aid or an additive, including but not limited to fillers, inner release agents, flame retardants, smoke suppressants, dyes, pigments, antistatic agents, antioxidants, UV stabilizers, diluents, antifoam agents, coupling agents, surface wetting agents, leveling agents, moisture scavengers, catalysts, molecular sieves, thixotropic agents, plasticizers, blowing agents, foam stabilizers, foam homogenizers, radical reaction suppressants, or combinations thereof, which may be optionally included in isocyanate component A) and/or isocyanate-reactive component B). These ingredients may also be stored separately as component D). When used to prepare the polyurethane composite material, component D) may be mixed with isocyanate component A) and/or isocyanate-reactive component B) prior to the preparation.

In some embodiments of the invention, the filler is selected from the group consisting of aluminum hydroxide, bentonite, fly ash, wollastonite, perlite powder, fly ash floating beads, calcium carbonate, talc powder, mica powder, porcelain clay, fumed silica, expandable microspheres, diatomite, pozzuolana, barium sulfate, calcium sulfate, glass microspheres, rock powder, wood flour, wood chips, bamboo flour, bamboo chips, rice grains, chopped crop straw, chopped broomcorn straw, graphite powder, metal powder, recycled powder of thermosetting composite materials, plastic particles or powder, or combinations thereof. The glass microspheres may be solid or hollow.

Inner release agents suitable for the invention include any conventional release agents for manufacturing polyurethane, and examples include long-chain carboxylic acids, particularly fatty acids, such as stearic acid; amines of long-chain carboxylic acids, such as stearamide; fatty acid esters; metal salts of long-chain carboxylic acids, such as zinc stearate; or polysiloxanes.

Examples of flame retardants suitable for the invention include triaryl phosphates, trialkyl phosphates, triaryl or trialkyl phosphates containing halogen, melamine, melamine resin, halogenated paraffin, red phosphorus or combinations thereof.

Other aids suitable for the invention include moisture scavengers, such as molecular sieves; antifoaming agents, such as polydimethylsiloxane; coupling agents, such as monoethylene oxide or organoamine functionalized trialkoxysilane or combinations thereof. A coupling agent is particularly preferred for enhancing the binding strength between a resin matrix and a fibrous reinforcement material. A fine filler, for example, clay or fumed silica, is usually used as a thixotropic agent.

Radical reaction suppressants suitable for the invention include polymerization inhibitors, polymerization retarders and the like, such as some phenol, quinine or hindered amine compounds, examples of which include methylhydroquinone, p-methoxyphenol, benzoquinone, polymethyl piperidine derivatives, low valence copper ions, etc.

II. Preparation of Polyurethane Composite Material

In another aspect of the invention, there is provided a process of preparing a polyurethane composite material which comprises a polyurethane resin matrix and a reinforcement material, comprising: preparing the polyurethane resin matrix under such reaction conditions that a polyurethane composition undergoes addition polymerization reaction of isocyanate groups and hydroxyl groups and radical polymerization reaction simultaneously, wherein the polyurethane composition is described above.

In an embodiment of the invention, the polyurethane addition polymerization (i.e. the addition polymerization of isocyanate group and hydroxyl group) and the radical polymerization occur at the same time. As known to one skilled in the art, tin or amine catalysts may be used to promote polyurethane addition polymerization; heat or promotors such as aniline compounds may be used to accelerate radical polymerization; and promoters such as cobalt salts may promote both polyurethane addition polymerization and radical polymerization. Hence, one skilled in the art may choose suitable conditions such that a polyurethane composition undergoes addition polymerization reaction of isocyanate groups and hydroxyl groups and radical polymerization reaction simultaneously.

The polyurethane composite material of the invention may be prepared by a vacuum infusion process for polyurethane. The operation of a vacuum infusion process for polyurethane is well known to those skilled in the art, and is described, for example, in the disclosure of CN 1954995A, the content of which is incorporated herein in its entity by reference.

In the vacuum infusion process, one or more pieces of a core material are disposed in a mold, wherein the core material is optionally covered with a reinforcement material completely or partly. Then, a negative pressure is formed in the mold, such that a polyurethane resin is infused into the mold. Prior to curing, the polyurethane resin will wet the reinforcement material completely. The core material will be wetted by the polyurethane resin completely or partly, too. Subsequently, suitable conditions are employed to allow the polyurethane resin to undergo polyurethane addition polymerization reaction and radical polymerization reaction simultaneously, such that the polyurethane resin is cured to form a polyurethane resin matrix. In the above vacuum infusion process, the mold may be a common mold in the art. The mold may be selected by one skilled in the art according to the desired properties and dimensions of the final product. When the vacuum infusion process is used to prepare a large article, in order to guarantee a sufficient pot-life, the viscosity of the resin shall be kept low enough to maintain desirable flowability during infusion. If the viscosity of the resin is higher than 600 mPa·s, the viscosity will be viewed unduly high such that the flowability becomes poor and the resin is not suitable for the vacuum infusion process.

As used herein, the term "pot-life" is defined as the period of time from the point when a polyurethane composition is mixed to the point when the viscosity reaches 600 mPa·s.

As used herein, the term "gel time" means the period of time from the point when a polyurethane composition is mixed to the point when the composition begins to appear in a gel state. In the invention, the gel time is determined using a gelometer.

The use of a core material in combination with a polyurethane resin matrix and a reinforcement material facilitates the molding of the composite material and the weight reduction of the composite material. A core material commonly used in the art may be used for the polyurethane composite material of the invention, examples of which include but are not limited to polystyrene foam such as COMPAXX® foam; polyester PET foam; polyimide PMI foam; polyvinyl chloride foam; metal foams, such as those available from Mitsubishi Co.; balsa wood; and the like. In an embodiment of the invention, the reinforcement material preferably has an amount of 1-90 wt. %, more preferably 30-85 wt. %, most preferably 50-75 wt. %, based on 100 wt. % by weight of the polyurethane composite material.

In some embodiments of the invention, the polyurethane composition comprises one or more organic polyols, wherein the organic polyols have a functionality of 1.9-4.5, more preferably 2.6-4.0, still preferably 2.8-3.3, and a hydroxyl number of 150-550 mgKOH/g, more preferably 250-400 mgKOH/g, still preferably 300-370 mgKOH/g. The polyurethane composition is suitable for the polyurethane vacuum infusion process to prepare a polyurethane composite material, wherein the pot-life is fairly long. The polyurethane composite material prepared by the polyurethane vacuum infusion process has good mechanical properties, and particularly, it has a high thermal deformation temperature. As such, the problem in the art that the pot-life of the polyurethane composition and the thermal deformation temperature of the resulting polyurethane composite material can not be improved at the same time has been solved. These polyurethane composite materials may be used to manufacture wind generator blades, wind generator nacelle housings, watercraft propeller blades, hulls, interior and exterior automobile decorative parts, automobile bodies, radomes, machinery structural members, decorative parts and structural members for architectures and bridges.

The polyurethane composite material of the invention may be prepared by a process selected from compression molding, filament winding, hand lay-up moulding, spray lay-up moulding and combinations thereof. See Chapters 2 and 6-9 in Composite Material Processes And Equipments (Liu Xiongya, et al., 1994, Publishing House of Wuhan University of Technology) for details about these processes. This literature is incorporated herein in its entity by reference.

In some other embodiments of the invention, the polyurethane composition comprises one or more polyether polyols, wherein the polyether polyols have a functionality of 1.7-6, more preferably 2.5-5.8, still preferably 2.7-4.5, and a hydroxyl number of 150-1100 mgKOH/g, more preferably 250-550 mgKOH/g, still preferably 300-450 mgKOH/g. The polyurethane composition is useful in a compression molding process for preparing a polyurethane composite material which may be used to manufacture fiber reinforcement bars or anchor rods in place of steel bars. The specific production process can be found in CN1562618A, CN1587576A, CN103225369A, U.S. Pat. Nos. 5,650,109A, 5,851,468A, US2002031664A, WO2008128314A1, and U.S. Pat. No. 5,047,104A which are incorporated herein in their entity by reference.

The invention will be further illustrated with reference to the following specific examples. However, it is to be appreciated that these examples are only intended to illustrate the invention without limiting the scope of the invention.

EXAMPLES

The test methods in the following examples for which no specific conditions are indicated will be carried out generally under conventional conditions or under those conditions suggested by the manufacturers. All percentages and parts are based on weight unless otherwise specified.

The starting materials used in the examples are listed as follows:

Desmodur 1511 L: an isocyanate, isocyanate group content 31.4 wt. %, average functionality 2.7, available from Bayer Material Science Corporate;

Polyether polyol 1: a polyol having a functionality of 3 and a hydroxyl number of 470 KOH/g, prepared using glycerin as a starter and propylene oxide as the main polymerization component;

Polyether polyol 2: a polyol having a functionality of 3 and a hydroxyl number of 350 KOH/g, prepared using glycerin as a starter and propylene oxide as the main polymerization component;

Hydroxypropyl methacrylate: available from Hersbit Chemical Co.;

Benzoyl peroxide: available from Aladdin Reagent Co.;

Initiator 925H: available from Syrgis Co.;

BAYLITH L-paste: molecular sieve, available from Shanghai Huanqiu Molecular Sieve Co., Ltd.;

BYK 066 N: a defoaming agent, available from Byk Co.;

H8006R: a defoaming agent, which is a silicone air release agent, available from Hensin Co.;

The tensile properties of the resin are determined according to ISO 527-2;

The curing volume of the resin is determined according to ISO 3521;

HDT is determined according to ISO 75-2.

The gel time is determined as follows: the polyurethane composition is agitated at room temperature in a centrifugal agitator at 2000 rpm for 1 minute, and then the gel time is measured using a gelometer. Time is counted when the agitation is started. The gelometer useful in the invention may be, for example, GTS-THP available from Paul N. Gardner, Co., USA.

In the following examples, the isocyanate index is defined as follows:

$$X(\%) = ([\text{moles of the isocyanate group (NCO group)} \text{ in component A}]) / [\text{moles of the isocyanate-reactive group in component B}] \times 100\%,$$

wherein component A refers to the organic isocyanate component, and component B refers to all the other components except for the organic isocyanate component.

Examples 1-3

First, a cast mold was placed in an oven at 160° C. Then, the components listed in Table 1 were blended in the specified proportions. Subsequently, the resin was mixed in a centrifugal agitator at 1500 rpm for 10 minutes. Then, the resin was poured into the mold and allowed to cure at 160° C. for 10 minutes to afford the polyurethane resin matrice of Comparative Examples 1-2 and Examples 1-3.

TABLE 1

| | | \multicolumn{5}{c}{Polyurethane compositions and mechanical properties thereof} | | | | |
|---|---|---|---|---|---|---|
| Examples | Formulation | Comparative Example 1 | Comparative Example 2 | Example 1 | Example 2 | Example 3 |
| Component B | Polyether polyol 1 | 100 | 30 | 50 | 60 | 90 |
| | Hydroxypropyl methacrylate | / | 70 | 50 | 40 | 10 |
| | L-paste | 4 | 4 | 4 | 4 | 4 |
| | Benzoyl peroxide | / | 2 | 2 | 2 | 2 |
| Component A | Desmodur 1511L | 118 | 104 | 108 | 110 | 116 |
| Isocyanate index (%) | | 105 | 105 | 105 | 105 | 105 |
| Fraction of polyol in polyurethane composition | | | / | 14.6% | 23.8% | 28.3% | 41.3% |
| Fraction of Hydroxypropyl methacrylate in polyurethane composition | | | / | 34.0% | 24.0% | 18.9% | 4.6% |
| Reactivity | Gel time | 80 minutes | 410 minutes | 270 minutes | 211 minutes | 120 minutes |
| | Pot-life | 34 minutes | 141 minutes | 115 minutes | 81 minutes | 41 minutes |
| | Temperature/° C. | 23 | 23 | 23 | 23 | 23 |
| Mechanical properties | Barcol hardness (Hba) | 35 | 55 | 53 | 50 | 38 |
| | Tensile modulus (MPa) | 3100 | / | 3900 | 4200 | 3300 |
| | Tensile strength (MPa) | 80 | / | 84 | 95 | 85 |
| | Tensile elongation at break (%) | 5.6 | / | 3.0 | 63.9 | 4.5 |
| | Volume shrinkage (%) | 8.4 | 11.4 | 9.4 | 9 | 9.3 |

Comparison between Comparative Examples 1-2 and Examples 1-3 indicates that when hydroxypropyl methacrylate is used, the gel time and pot-life of the resin is increased remarkably, and the tensile modulus and tensile strength are enhanced greatly too. However, Example 3 shows that when hydroxypropyl methacrylate is too little, pot-life increase is not long enough. When the polyol comprises 28.3% of the polyurethane composition, the tensile strength and modulus of the polyurethane composition are maximized, the tensile elongation at break is relatively high, and the volume shrinkage is minimized. In Comparative Example 2, the curing shrinkage is too large, such that the plate prepared from the resin warps and cracks, and no article can be cut therefrom. Therefore, amount of hydroxypropyl methacrylate must not be too high.

Example 4

The isocyanate component was vacuumed at room temperature for 0.1-2 h to expel bubbles from the starting material. The moisture content in each polyol component was controlled below 0.1%, and the polyol component was vacuumed at room temperature for 0.1-2 h to expel bubbles from the starting material. Then, the isocyanate component and the polyol component (Index 101) were blended in the proportions listed in Table 2, and 0.5% 925 H, 0.5% BYK 066 N and 0.5% H8006R (weight percentage based on the total weight of the isocyanate component and the polyol component) were added. After mixed thoroughly, the resulting mixture was monitored. The pot-life (operable time) value was obtained by monitoring the viscosity variation which was observed by measuring the viscosity of the mixture system at intervals. The resulting resin was charged into a cast mold, cured at room temperature, and cured at 80° C. for another two hours. The polyurethane resin matrice of Comparative Example 3 and Example 4 were obtained.

TABLE 2

Polyurethane compositions and mechanical properties thereof

| | | Examples | |
|---|---|---|---|
| Formulation | | Comparative Example 3 | Example 4 |
| Component B | Polyether polyol 2 | 100 | 68 |
| | Fraction of polyol in polyurethane composition | / | 36.3 |
| | Hydroxypropyl methacrylate | / | 32 |
| | Fraction of Hydroxypropyl methacrylate in polyurethane composition | / | 17.0% |
| | 925H | / | 2 |
| Component A (Index) | Desmodur 1511L | 85 | 88 |
| Reactivity | Pot-life (min.) | 39 | 87 |
| | Gel-time (min.) | 86 | 217 |
| Mechanical properties | Shore D | 85 | 86 |
| | Tensile modulus (MPa) | 3100 | 3200 |
| | Tensile strength (MPa) | 61 | 72 |
| | Tensile elongation at break (%) | 3.4 | 4.6 |
| | Bend strength (MPa) | 103 | 118 |
| | Thermal deformation temperature (HDT/° C.) | 61 | 91 |

Comparison between Comparative Example 3 and Example 4 indicates that when hydroxypropyl methacrylate is used, the gel time, HDT and pot-life of the resin are increased remarkably, and the tensile modulus, tensile strength and the bend strength are enhanced greatly too. As shown by the comparison between Comparative Example 3 and Example 4, the polyurethane resin matrix obtained by addition of hydroxypropyl methacrylate exhibits better comprehensive properties than a conventional polyurethane resin.

Example 5

The polyurethane composite materials in this example were based on the polyurethane compositions of Comparative Example 3 and Example 4, prepared by the vacuum infusion process and measured for their properties.

The operation was conducted on a flat glass plate as follows: a piece of uniaxial glass fiber cloth (available from SAERTEX Reinforcements (Dongying) Co., uniaxial glass fiber, oriented at 0 degree, 14EU970-01190-(width)-100000) was placed on a surface of a flat glass plate spray-coated with a release agent, and then a piece of release cloth, a fluid-conducting web and a vacuum bag were placed thereon in sequence. This device was connected to vacuum at the front, and to the liquid resin at the rear through a fluid-conducting pipe.

The isocyanate component was vacuumed at room temperature for 0.1-2 h to expel bubbles from the starting material. The moisture content in each polyol component was controlled below 0.1%, and the polyol component was vacuumed at room temperature for 0.1-2 h to expel bubbles from the starting material. Then, the isocyanate component and the polyol component (Index 1.02) were blended in the proportions listed in Table 2, and 0.5% 925 H, 0.5% BYK 066 N and 0.5% H8006R (weight percentage based on the total weight of the isocyanate component and the polyol component) were added. After mixed thoroughly, the resulting mixture was introduced into the glass fiber cloth in the above device under vacuum. After the glass fiber glass was wetted completely, the whole system wetted thoroughly by the polyurethane resin was held under vacuum condition. After cured at room temperature, it was aged at 80° C. for another hour, and a polyurethane composite material reinforced by glass fiber cloth was obtained. The properties of the resulting polyurethane composite materials are shown below.

The properties of the polyurethane composite materials of the invention are listed in Table 3.

TABLE 3

Properties of polyurethane composite materials

| Physical properties | Comparative Example 4 | Example 5 |
|---|---|---|
| Tensile strength (MPa) | 830 | 1020 |
| Tensile modulus (MPa) | 38000 | 44200 |
| Tensile elongation at break (%) | 4.2 | 7.6 |

Comparison between Comparative Example 4 and Example 5 indicates that when hydroxypropyl methacrylate is used, the resulting polyurethane resin matrix can afford a composite material having better mechanical properties than a composite material prepared from a prior art polyurethane resin.

What is claimed is:

1. A non-foamed polyurethane composite material, comprising a homogeneous polyurethane resin matrix prepared from a polyurethane composition and a reinforcement material, wherein the polyurethane composition comprises:
   A) an isocyanate component comprising one or more organic polyisocyanates;

B) an isocyanate-reactive component comprising:

b1) one or more organic polyols having an amount of 21-60 wt. % based on 100% by weight of the polyurethane composition;

b2) one or more compounds having structure (I)

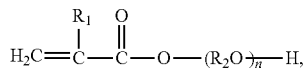

wherein $R_1$ is selected from hydrogen, methyl or ethyl; $R_2$ is selected from alkylene groups having 2-6 carbon atoms, 2,2-bis(4-phenylene) propane, 1,4-bis(methylene) benzene, 1,3-bis(methylene) benzene, 1,2-bis(methylene) benzene; n is an integer selected from 1-6; and C) a radical reaction initiator, wherein the polyurethane resin matrix is prepared under such reaction conditions that the polyurethane composition undergoes addition polymerization reaction of isocyanate groups and hydroxyl groups and radical polymerization reaction simultaneously, and wherein the polyurethane composite is prepared by a process selected from compression molding, hand lay-up moulding, or filament winding.

2. The polyurethane composite material according to claim 1, wherein the component b1) is selected from one or more polyether polyols.

3. The polyurethane composite material according to claim 1, wherein the component b2) is selected from the group consisting of hydroxyethyl methacrylate, hydroxypropyl methacrylate, hydroxybutyl methacrylate, hydroxyethyl acrylate, hydroxypropyl acrylate, hydroxybutyl acrylate and combinations thereof.

4. The polyurethane composite material according to claim 1, wherein the organic polyols have a functionality of 1.7-6 and a hydroxyl number of 150 to 1100 mg KOH/g.

5. The polyurethane composite material according to claim 4, wherein the polyurethane composite material is prepared by vacuum infusion process.

6. The polyurethane composite material according to claim 1, wherein the reinforcement material is selected from the group consisting of glass fibers, carbon nanotubes, carbon fibers, polyester fibers, natural fibers, aramid fibers, nylon fibers, basalt fibers, boron fibers, silicon carbide fibers, asbestos fibers, whiskers, metal fibers and combinations thereof.

* * * * *